(12) United States Patent
Tytgat et al.

(10) Patent No.: US 10,295,847 B1
(45) Date of Patent: May 21, 2019

(54) DUAL-DRIVE PUSH-PULL OPTICAL MODULATOR WITH ELECTRICAL COMMON-MODE SUPPRESSION

(71) Applicant: Nokia Solutions and Networks Oy, Espoo (FI)

(72) Inventors: Maarten Huberdina Pascal Tytgat, Amsterdam (NL); Guilhem De Valicourt, Jersey City, NJ (US); Sian Chong Jeffrey Lee, Summit, NJ (US); Michael Scott Eggleston, New York, NY (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/818,998

(22) Filed: Nov. 21, 2017

(51) Int. Cl.
| G02F 1/025 | (2006.01) |
| G02F 1/01 | (2006.01) |
| H04B 10/58 | (2013.01) |
| G02F 1/225 | (2006.01) |
| H04B 10/27 | (2013.01) |
| G02F 1/21 | (2006.01) |

(52) U.S. Cl.
CPC .......... *G02F 1/0121* (2013.01); *G02F 1/2257* (2013.01); *H04B 10/27* (2013.01); *H04B 10/58* (2013.01); *G02F 2001/212* (2013.01)

(58) Field of Classification Search
USPC .......................................................... 385/2
See application file for complete search history.

(56) References Cited

U.S. PATENT DOCUMENTS

| 6,064,507 | A | 5/2000 | Heflinger et al. |
| 6,262,834 | B1 | 7/2001 | Nichols et al. |
| 6,933,583 | B2 | 8/2005 | Kunkee et al. |
| 7,082,237 | B2 | 7/2006 | Walker et al. |
| 7,657,130 | B2 | 2/2010 | Shastri et al. |
| 8,917,958 | B2 | 12/2014 | Prosyk |
| 9,008,469 | B2 | 4/2015 | Prosyk |
| 9,069,223 | B2 | 6/2015 | Prosyk |
| 9,244,327 | B2* | 1/2016 | Prosyk ................ G02F 1/225 |
| 2002/0071622 | A1 | 6/2002 | Betts et al. |
| 2004/0165893 | A1 | 8/2004 | Winzer |
| 2016/0139485 | A1 | 5/2016 | Winzer et al. |

FOREIGN PATENT DOCUMENTS

CN        106850068      *  6/2017

* cited by examiner

*Primary Examiner* — Eric Wong
(74) *Attorney, Agent, or Firm* — Chiesa Shahinian & Giantomasi PC (57) ABSTRACT

A dual-drive push-pull Mach-Zehnder modulator is provided that suppresses electrical common-mode signal components using differential input in order to mitigate parasitic phase shift effects. The modulator is configured with at least two phase shifting sections with each having a respective set of diodes. Drive signals for each phase shifter are swapped by swapping two waveguide arms in which the first and second set of diodes are constructed in a particular configuration such that the electric field applied by each drive signal in the second set of diodes is the negative of what such signal was in the first set of set of diodes. As the input optical signal propagates through the first waveguide arm and the second waveguide arm, each arm independently modulates the phase which are then re-combined to provide an optical output signal with at least one suppressed signal component.

18 Claims, 9 Drawing Sheets

DUAL-DRIVE PUSH-PULL OPTICAL MODULATOR WITH ELECTRICAL COMMON-MODE SUPPRESSION

TECHNICAL FIELD

The present invention relates generally to optical modulators, and more particularly, to dual-drive push-pull Mach-Zehnder modulators.

BACKGROUND OF THE INVENTION

Optical modulators are commonly employed in the field of optical communications to accept modulated data in electrical format (e.g., radio frequency or RF) and transfer data to an optical carrier. A Mach-Zehnder modulator (hereinafter alternatively referred to as "MZM") generally utilizes a beam-splitter that divides laser light from an input optical waveguide into two optical beams. These optical beams then propagate in parallel waveguides defining separate optical paths, at least one of which have a phase modulator in which the refractive index is a function of the strength of the locally applied electrical field.

In today's optical networks, Mach-Zehnder modulators are widely being used as intensity and phase modulators. Initial commercially available Mach-Zehnder modulators were based on non-semiconducting materials such as lithium-niobate, but currently such MZMs are also available in a variety of semiconducting materials (in particular, III-V semiconductors) such as Indium Phosphide (InP), Gallium Arsenide (GaAs), Silicon, polymer, to name just a few.

A typical optical MZM is based on an optical splitter (e.g., multimode interference (MMI) optical waveguide or directional coupler), two optical paths (typically referred to as the "arms" of the MZM) and an optical combiner (e.g., MMI or directional coupler). An intensity or phase modulation results from the phase difference between the two optical signals propagating in each arm of the MZM. By using an electro-optic effect on one or both arms of the MZM, the refractive index of the material can be changed locally by applying a voltage, resulting in a phase shift of the optical signal propagating through such zone. As such, the MZM can be operated with a phase change in one arm or in both arms. In the latter case, the well-known term "push-pull" is used to designate the optical operation defined by causing an equal but opposite phase change in each arm, such that only half the phase change is needed on each arm compared to the case where only one arm is modulated in order to achieve the same total phase difference and resulting amplitude modulation.

For push-pull Mach-Zehnder modulators, two structures are generally utilized: so-called single-drive and dual-drive. With a single-drive MZM integrated circuit design, the problem is that only single-ended drivers can be used and that the N-region of the integrated circuit needs to be biased through a large resistor or inductor. This introduces extra cost and size, and causes certain high-pass behaviours. This high-pass behaviour results in baseline wander effect, which in in-phase quadrature (IQ) modulation, results in distorted quadrature-amplitude modulation (QAM) constellations. These types of effects cannot be easily compensated with digital signal processing, due to the low-frequency (i.e., long time period) character of such impairments.

Alternatively, in a dual-drive MZM integrated circuit design, both electrodes are ideally driven with out-of-phase signals and modulating the optical phase in both arms. In this case, the N-region is not exposed to an alternating current (AC) signal and the direct current (DC) bias can just be applied directly, without the need for a resistor or inductor. As such, this simplifies the circuit design and allows for an electro-optical transfer function that goes down to DC. Further, this dual-drive MZM configuration is also compatible with differential-output drivers which makes the design of the driver much easier and more robust. For example, in advanced silicon CMOS or SiGe BiCMOS processes, it is advantageous to make amplifiers fully-differential (i.e., differential signals in and out) for high signal frequencies. The differential structure inherently rejects such common-mode (CM) signals, which could appear due to unwanted coupling of external noise sources or because of variation on the power supply or ground nets. Moreover, differential amplifiers tend to be more linear because even-order harmonics are cancelled out, and the differential output offers double the signal swing compared to a single-ended output, for the same supply voltage. These combined advantages result in a driver that is more power-efficient and has higher performance compared to a single-ended driver.

However, one disadvantage of the dual-drive structure is that a common-mode signal on the electrodes causes a parasitic phase shift which is deleterious to MZM performance, and requires that such dual-drive MZMs be designed according to very stringent requirements to compensate for the effects of this parasitic phase shift thereby increasing design complexity and cost.

Therefore, a need exists for an improved dual-drive push-pull Mach-Zehnder modulator that mitigates parasitic phase shift effects from CM signal components.

BRIEF SUMMARY OF EMBODIMENTS

In accordance with various embodiments, a dual-drive push-pull Mach-Zehnder modulator is provided that suppresses the electrical CM signal component using differential input in order to mitigate parasitic phase shift effects (also referred to herein as "base wander effect"). In accordance with various embodiments, the dual-drive push-pull MZM design is such that there is no biasing required through a resistor and/or inductor to achieve the base wander effect advantages.

In accordance with an embodiment, a dual-drive push-pull MZM is fabricated in a substrate (e.g., an electro-optic substrate, such as a III-V semiconductor; e.g., Indium Phosphide (InP)) and receives an optical input signal (e.g., a continuous wave optical signal from a laser source) which is thereafter split by a splitter to propagate the optical input signal along a first waveguide arm and a second waveguide arm, respectively. Further, in accordance with the embodiment, the MZM is configured with multiple phase shifting sections, illustratively, at least two phase shifting sections, namely, a first phase shifting section and a second phase shifting section. The first phase shifting section comprising a first set of diodes, and the second phase shifting section comprising a second set of diodes. Illustratively, the first phase shifter and the second phase shifter are inter-connected (e.g., in a serial or parallel configuration) to one another for modulating the optical signal.

In accordance with the embodiment, the second phase shifting section is added to each waveguide arm such that the second pair of phase shifters, as driven by a respective drive signal (e.g., a second drive signal), are comprised of diodes (i.e., the second set of diodes) with a substantially similar connection configuration to the first set of diodes (as driven by a respective drive signal, i.e., a first drive signal). In particular, the second set of diodes are in a P-type layer/N-type layer/P-type layer (PNP) connection configuration to the same as a P-type layer/N-type layer/P-type layer (PNP) connection configuration of the first set of diodes.

As such, the drive signals (i.e., the first drive signal and the second drive signal) for each phase shifter are swapped by swapping the two waveguide arms (i.e., the first waveguide arm and the second waveguide arm having a particular configuration through the optical modulator), such that the first and second drive signals are applied to the first waveguide arm (i.e., the top arm), and to the second waveguide arm (i.e., the bottom arm) as they pass through the optical modulator. In this way, given that the second set of diodes are constructed in the same (or substantially the same) connection configuration with the first set of diodes, but with the waveguides swapped in the respective phase shifter sections, the electric field applied by each drive signal (i.e., a first electrical field and a second electrical field) in the second set of diodes is the negative of what such signal (i.e., either the first electrical field or the second electrical field) was in the first set of set of diodes. As the input optical signal propagates through the first waveguide arm and the second waveguide arm, each arm independently modulates the phase and the split signals are ultimately combined by a combiner to provide an optical output signal.

In accordance with a further embodiment, the MZM suppresses the electrical CM signal component using differential input in order to mitigate parasitic phase shift effects where the drive signals (i.e., first drive signal and second drive signal) are crossed instead of the optical waveguides through the multiple phase shifting sections. In this embodiment the MZM is fabricated in an electro-optic substrate and receives an optical input signal which is thereafter split at a splitter to propagate along the first waveguide arm and the second waveguide arm. The MZM is configured with at least two phase shifting sections, i.e., a first phase shifting section and a second phase shifting section. In accordance with the embodiment, the second phase shifting section is added to each waveguide arm and is driven by a second drive signal, and comprised of a second set of diodes with opposite connections than a first set of diodes, as driven by a first drive signal in the first phase shifting section. In particular, the second set of diodes are in a N-type layer/P-type layer/N-type layer (NPN) connection configuration as opposed to the P-type layer/N-type layer/P-type layer (PNP) connection configuration of the first set of diodes. Illustratively, the first phase shifter and the second phase shifter are inter-connected (e.g., in a serial or parallel configuration) to one another for modulating the optical signal.

In accordance with this further embodiment, the drive signals (i.e., the first drive signal and the second drive signal) for each phase respective shifter are swapped, instead of swapping by and through the optical waveguides (as detailed previously). In this way, given that the second set of phase shifter diodes are constructed in a reverse configuration (i.e., opposite of one another) from the first set of phase shifter diodes, in the respective phase shifting sections, the electric field applied by each drive signal (i.e., a first electrical field and a second field) in the second set of diodes is the negative of what such signal (i.e., either the first electrical field or the second electrical field) was in the first set of diodes. As the input optical signal propagate through the first waveguide arm and second waveguide arm, each arm independently modulates the phase and the split signals are by a combiner to provide an optical output signal.

These and other advantages will be apparent to those of ordinary skill in the art by reference to the following detailed description and the accompanying drawings.

DETAILED DESCRIPTION

In accordance with various embodiments, a dual-drive push-pull Mach-Zehnder modulator is provided that suppresses the electrical CM signal component using differential input in order to mitigate parasitic phase shift effects. In accordance with various embodiments, the dual-drive push-pull MZM design is such that there is no biasing required through a resistor and/or inductor to achieve the base wander effect advantages.

In order to facilitate the understanding and explanation of the principles encompassed by the disclosed embodiments, certain technical and performance aspects related to single-drive and dual-drive push-pull Mach-Zehnder modulators will now be discussed in some detail.

Figure 1A:
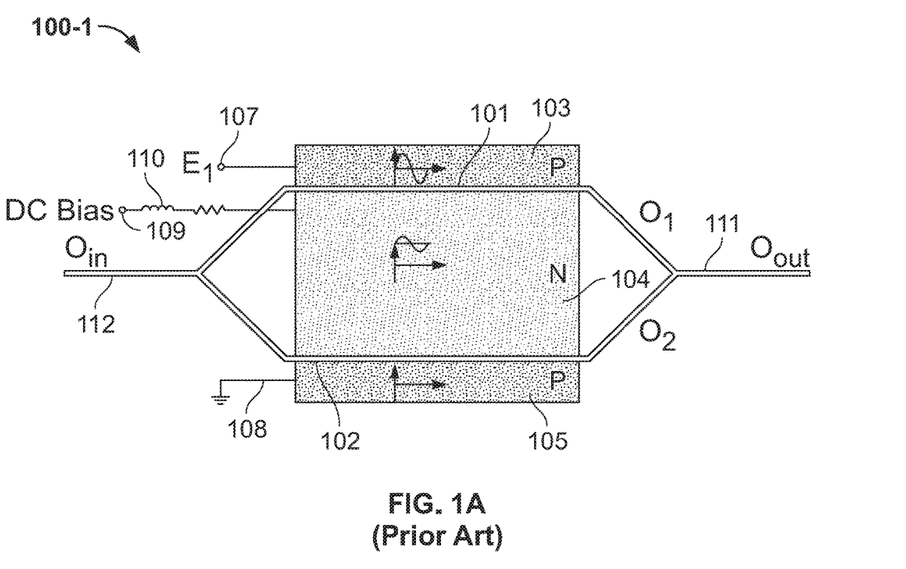
FIGS. 1A and 1B show illustrative schematics of a prior art single-drive push-pull MZM and a dual-drive push-pull MZM, respectively.
Figure 1B:
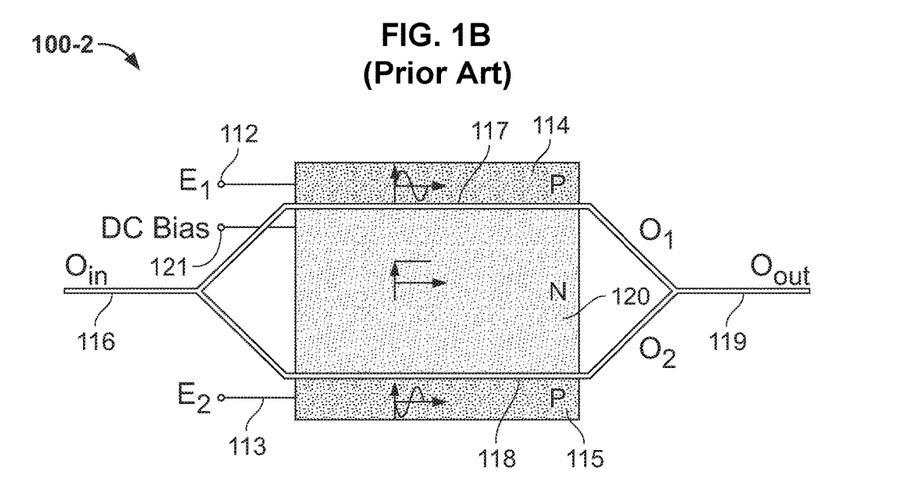

To that end, FIGS. 1A and 1B show illustrative schematics of a prior art single-drive push-pull MZM 100-1 and a dual-drive push-pull MZM 100-2, respectively. In FIG. 1A, the single-drive configuration has first waveguide arm 101 and second waveguide arm 102 for receiving input optical signal 112 (as split) and a modulating voltage 109 is applied to one electrode of MZM 100-1. The two P-regions (i.e., P-region 103 and P-region 105) are the electrodes. The top electrode (i.e. P-region 103) is excited with electrical signal 107, while the bottom electrode (i.e., P-region 105) is grounded (i.e., ground 108). A voltage division across the diodes ensures that both P-N junctions (i.e., the junction between P-region 103 and N-region 104, and between P-region 105 and N-region 104, respectively) receive the same RF voltage, but in opposite direction, looking from the respective P-region to N-region 104. In order not to bias the N-region, such that the P-N junctions are always in reverse bias, a large impedance (e.g., a resistance (R) or inductance (L)) is needed in series with the direct current (DC) voltage source, to make sure that the N-region is not grounded for alternating current (AC) operation.

As will be appreciated, the respective P-N junctions can be approximated by capacitors for the RF signal, and in order not to extinguish the RF signal in the N region, a resistor or capacitor need to present a large impedance compared to the capacitance, for all frequencies of operation. In an electro-optical transfer function, this will translate into a high-pass filter behaviour, where the lower cut-off frequency is determined by the size of the R or L. The higher this cut-off frequency, the more "baseline wander" or "droop" will occur on the signal (e.g., modulated output signal 111). This happens when signals with low frequency content are applied, such as signals with long strings of consecutive ones or zeros. On the other hand, implementing a large R or L, requires space on the particular semiconductor device or in the package, which translates to increased size and cost.

FIG. 1B shows illustrative schematic 100-2 of a prior art dual-drive push-pull MZM where both electrodes (i.e., P-region 114 as the first electrode, and P-region 115 as the second electrode, respectively) are driven with out-of-phase signals (i.e., signal 112 and signal 113), modulating the optical phase (e.g., input optical signal 116) in both arms (i.e., arm 117 and arm 118) and outputting optical signal 119. In this case, N-region 120 is not exposed to an AC signal and DC bias 121 can be applied directly, without the need for a resistor or inductor. This simplifies the circuit, allows for an electro-optical transfer function that goes down to DC, and is also compatible with differential-output drivers. That makes this design of the driver much easier and more robust particular when using well-known advanced processes such as silicon CMOS or SiGe BiCMOS, where it is typically advantageous to make amplifiers fully-differential (i.e., differential signals in and out) for high signal frequencies. The differential structure inherently rejects common-mode signals, which could appear due to unwanted coupling of external noise sources or because of the variation on the power supply or ground nets. Moreover, differential amplifiers tend to be more linear because even-order harmonics are cancelled out. Further, a differential output provides double the signal swing compared to a single-ended output, for the same supply voltage.

As will be appreciated, the combined advantages of the prior art dual-drive push-pull MZM of FIG. 1B result in a driver that is more power-efficient and has higher performance compared to a single-ended driver. However, the disadvantage of this structure is that a common-mode signal on the electrodes causes a parasitic phase shift which now be further discussed.

In the dual-drive push-pull MZM of FIG. 1B, the electrical field of the optical signals of the two branches can be treated as phasors with a certain amplitude $A_0$ (assumed the same for both branches) and phase $\varphi_1$ and $\varphi_2$ as given by Equation 1 as follows:

$$O_1 = A_0 \exp(j\phi_1)$$

$$O_2 = A_0 \exp(j\phi_2)$$

where $j = \sqrt{-1}$ is the imaginary part of a complex number; and
$\varphi_1$ is: phase 1 of the optical signal traveling through a first waveguide; and
$\varphi_2$ is: phase 2 of the optical signal traveling through a second waveguide.

The sum of these two phasors which represents the output signal $E_{out}$ of the dual-drive push-pull MZM of FIG. 1B is then given by Equation 2 as follows:

$$E_{out} = O_1 + O_2 = A_0(e^{j\phi_1} + e^{j\phi_2})$$

Where e is the natural exponential function.

The two relevant outputs of this dual-drive push-pull MZM are the optical intensity and optical phase, which are given by Equation 3:

$$I = A_0^2 \cos^2\left(\frac{\phi_1 - \phi_2}{2}\right)$$

$$\Delta\varphi = \frac{\phi_1 + \phi_2}{2}$$

For the two classes of modulators shown above, the output intensity and phase is then given by Table 1 as follows:

|  | Intensity Output (I) | Phase Output ($\Delta\varphi$) |
|---|---|---|
| Single-Drive | $A_0^2 \cos^2(\gamma V_1)$ | 0 |
| Dual-Drive | $A_0^2 \cos^2\left(\gamma \frac{V_1 - V_2}{2}\right)$ | $\gamma \frac{V_1 + V_2}{2}$ | where $V_1$ is: voltage 1;
$V_2$ is: voltage 2; and
$\gamma$ is a constant value relating the voltage to the associated\phase shift of a specific modulator.

For the single-drive configuration (shown in FIG. 1A), there is no parasitic phase modulation because the RF voltage across the two junctions is equal and opposite thanks to the voltage division. In the dual-drive configuration (as shown in FIG. 1B), opposite sign signals (i.e., differential signal input) are applied to electrodes $E_1$ and $E_2$ such that $V_2 = -V_1$. In practice, this equality is hard to achieve and the actual signals generated take the form of Equation 4:

$$V_1 = +\frac{1}{2} V_{DM} + V_{CM}$$

$$V_2 = -\frac{1}{2} V_{DM} + V_{CM}$$

where $V_{CM}$ is a common-mode (CM) signal; and
$V_{DM}$ is the differential-mode (DM) signal.

The resultant intensity and phase output of the dual-drive push-pull MZM are then given by Equation 5:

$$I = A_0^2 \cos^2\left(\gamma \frac{V_{CM} + V_{DM} - V_{CM} + V_{DM}}{2}\right) = A_0^2 \cos^2(\gamma V_{DM})$$

$$\Delta\varphi = \gamma \frac{V_{CM} + V_{DM} - V_{CM} + V_{DM}}{2} = \gamma V_{CM}$$

The above discussion (and associated Equations) therefore demonstrates that the DM component gives rise to the desired amplitude modulation of the optical signal, whereas the CM component causes a parasitic phase modulation of the optical signal. In modulation schemes where the phase of the signal is not of importance, such as on-off keying, this might not be an issue. But coherent systems require phase information too. If this phase is being corrupted by a CM component on the electrical signal, this could degrade the signal-to-noise ratio (SNR) and the bit-error-rate (BER) of the system.

Figure 2:
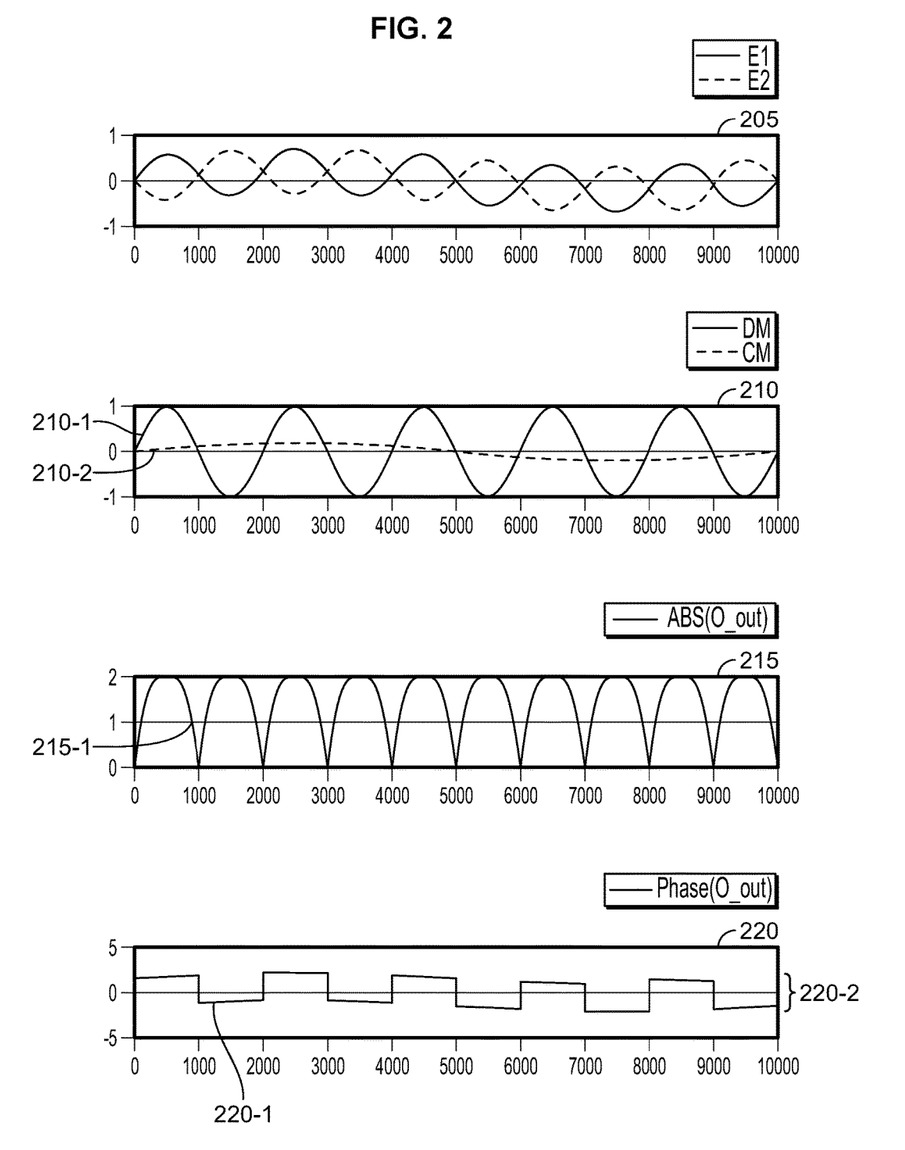
FIG. 2 shows simulation results of illustrative DM and CM component effects in a dual-drive push-pull MZM, where a differential signal is applied to the two electrodes, with a common-mode component added.

To further illustrate these DM and CM component effects, FIG. 2 shows simulation results 205, 210, 215, and 220, respectively, for a dual-drive push-pull MZM where a differential signal is applied to the two electrodes (i.e., applied to electrodes $E_1$ and $E_2$ such that $V_2 = -V_1$), with a common-mode component added. The differential-mode 210-1 and common-mode 210-2 components (i.e., DM and CM) are shown separately in simulation result 210. Amplitude 215-1 and phase 220-1 of the optical signal are shown in simulation result 215 and 220, respectively. Amplitude 215-1 reflects the desired amplitude modulation caused by the differential component of the signal. The phase 220-1 switches between $+/-\pi/2$ (90 degree), meaning that the output signal is a sine wave. On top of the desired $+/-\pi/2$ however, parasitic phase modulation 220-2 can be seen, which is caused by the common mode component of the input signal. Several causes of CM on the electrical signal include, but are not limited to, power supply noise, and residual distortion components.

Figure 3:
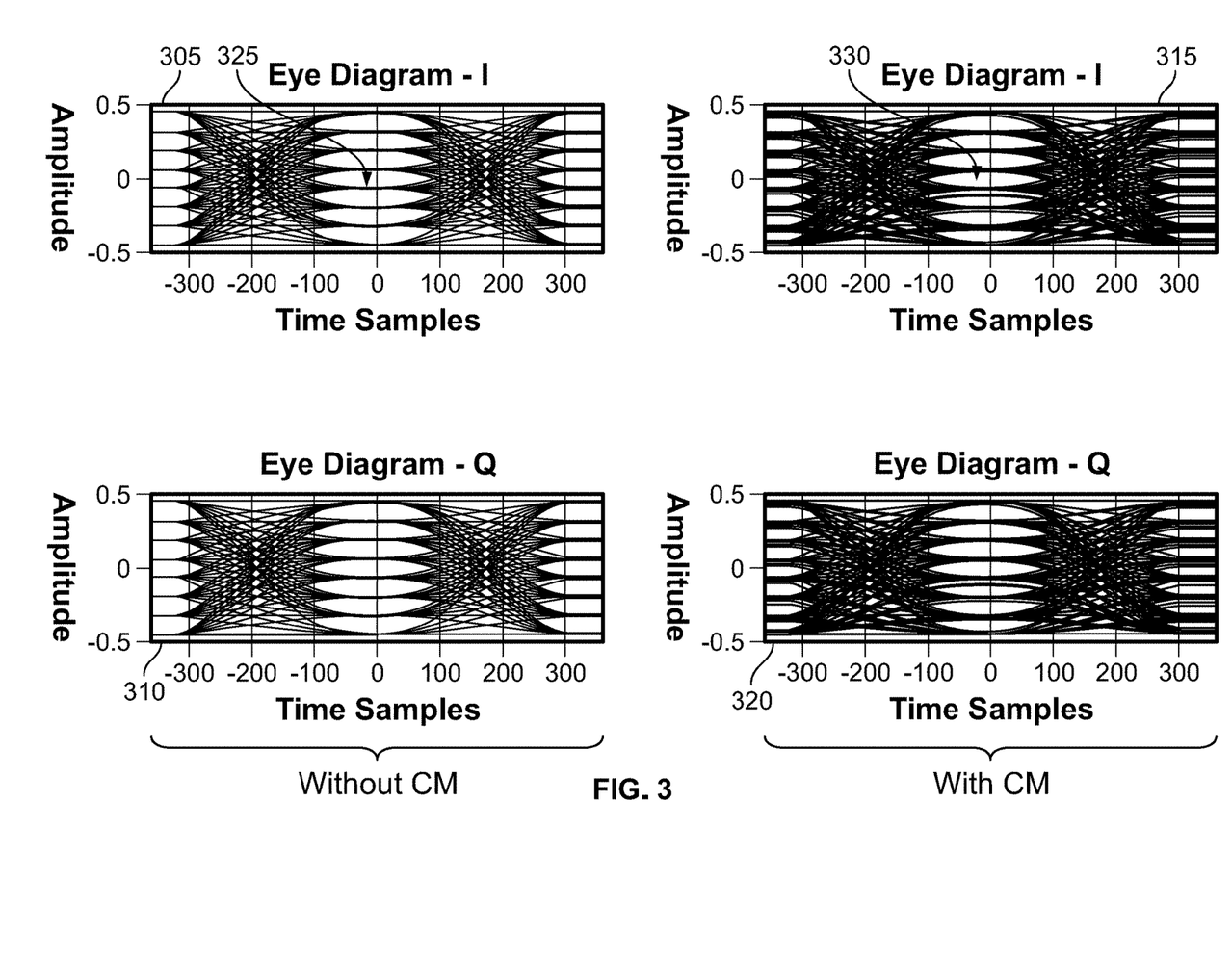
FIG. 3 shows an illustrative comparison of eye diagrams with respect to two driver out signals one with CM signal components and one without CM signal components.
Figure 4:
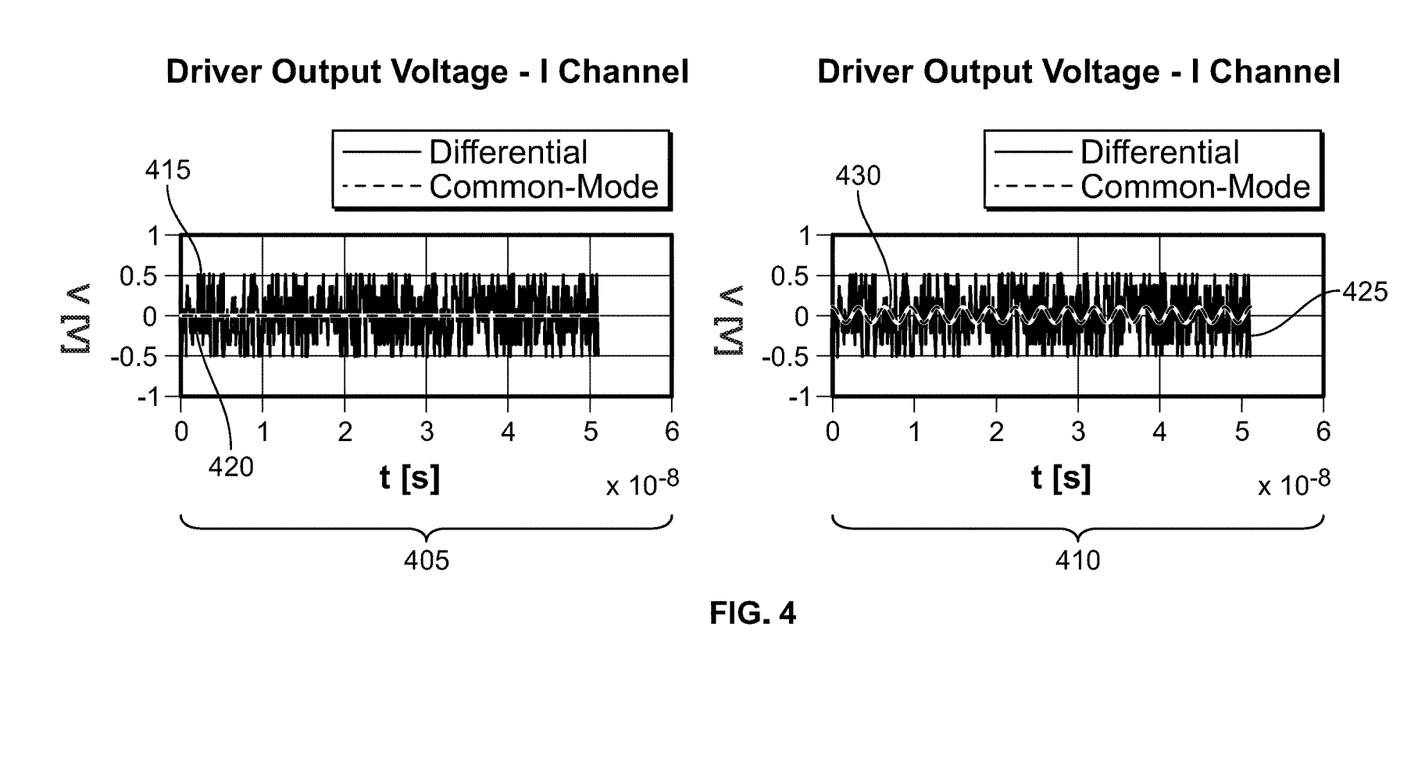
FIG. 4 shows two illustrative driver output signals, one without any CM on the output, and the other with a CM signal on the output.

The problems caused by the CM component are further illustrated in FIG. 3 which shows an illustrative comparison of eye diagrams (i.e., eye diagrams 305, 310, 315, and 320) with respect to two driver out signals, one with CM signal components and one without CM signal components. FIG. 4 shows two illustrative driver output signals (i.e., output signal 405 and output signal 410), where output signal 405 has DM signal components 415 but is without any CM signal components 420 (i.e., CM=0) on the output, and output signal 410 has DM signal components 425 and CM signal components 430 on the output.

As will be appreciated, in telecommunications, an eye pattern (also known as an eye diagram) is an oscilloscope display in which a digital signal from a receiver is repetitively sampled and applied to the vertical input, while the data rate is used to trigger the horizontal sweep. It is so-called because, for several types of coding, the pattern looks like a series of eyes between a pair of rails, and is a tool for the evaluation of the combined effects of channel noise and inter-symbol interference on the performance of a baseband pulse-transmission system, for example. Eye diagrams 305, 310, 315, and 320 where generated from sending two possible driver output signals through a MZM, one signal without any CM on its output, the other signal with CM on its output. It is clear that the eye opening degrades as a result of the parasitic phase modulation (for example, eye openings 325 as compared to eye openings 330).

Figure 5A:
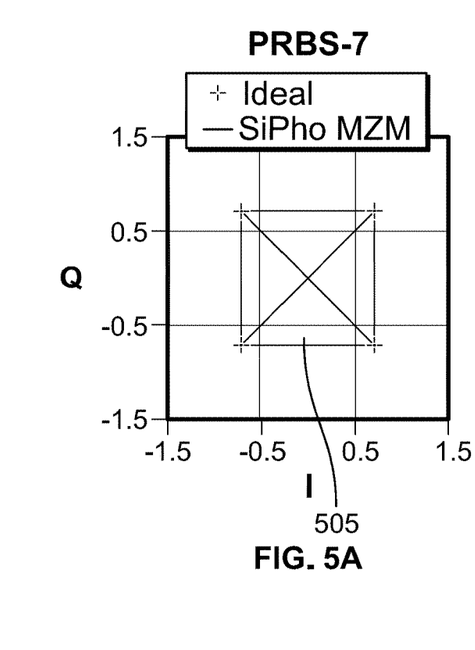
FIGS. 5A, 5B, and 5C show illustrative distorted quadrature-amplitude modulation (QAM) constellations resulting from baseline wander effect in a single-ended driver push-pull Mach-Zehnder modulator.
Figure 5B:
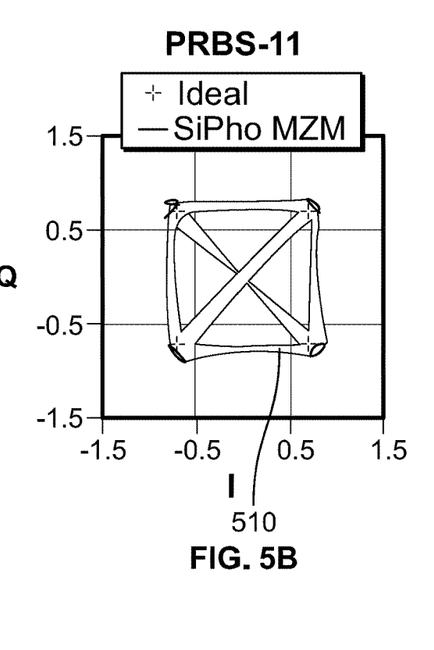
Figure 5C:
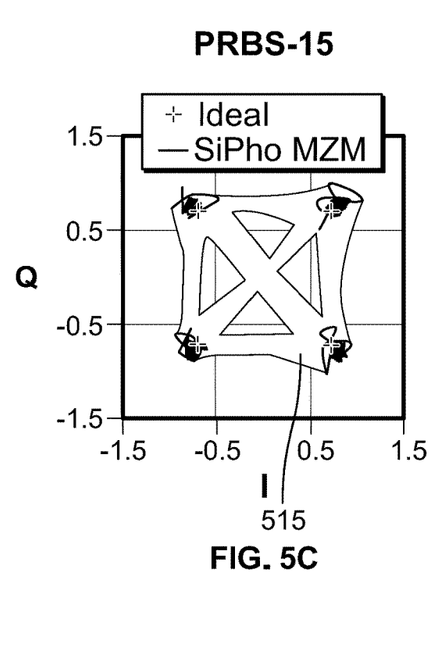

In terms of further highlighting the various problems to which the disclosed embodiments are directed to addressing and resolving, with respect to push-pull MZMs having a single-drive configuration, the problem is that only single-ended drivers can be used and that the N-region needs to be biased through a large resistor or inductor. This configuration introduces extra cost, increases overall size, and causes a high-pass behavior. This high-pass behavior results in baseline wander effect, which in in-phase quadrature (IQ) modulation, further results in distorted quadrature-amplitude modulation (QAM) constellations (i.e., QAM constellation 505, QAM constellation 510, and QAM constellation 515) as shown in FIGS. 5A, 5B and 5C. Such effects cannot be easily compensated with digital signal processing, due to the low-frequency (long time period) character of such impairments. In the dual-drive configuration, differential output drivers can be used to mitigate such baseline wander effects but the driver specifications will be more onerous, for example, the output common-mode signal has to be minimized or it will result in reduced performance. However, the dual-drive MZM may a preferred configuration in that such a configuration does not need any series resistor or inductor to bias the N region and will therefore exhibit good electrical-optical response from direct current (i.e., 0 Hz frequency content), thereby mitigating base wander effects (e.g., the illustrative base wander effects illustrated by FIGS. 5A-C).

In accordance with various embodiments herein, a dual-drive push-pull Mach-Zehnder modulator is provided that suppresses the electrical CM signal component using differential input in order to mitigate parasitic phase shift effects (i.e., base wander effect). In accordance with the embodiments, the dual-drive push-pull MZM configuration is such that there is no biasing required through a resistor and/or inductor to achieve the aforementioned base wander effect advantages.

Figure 6:
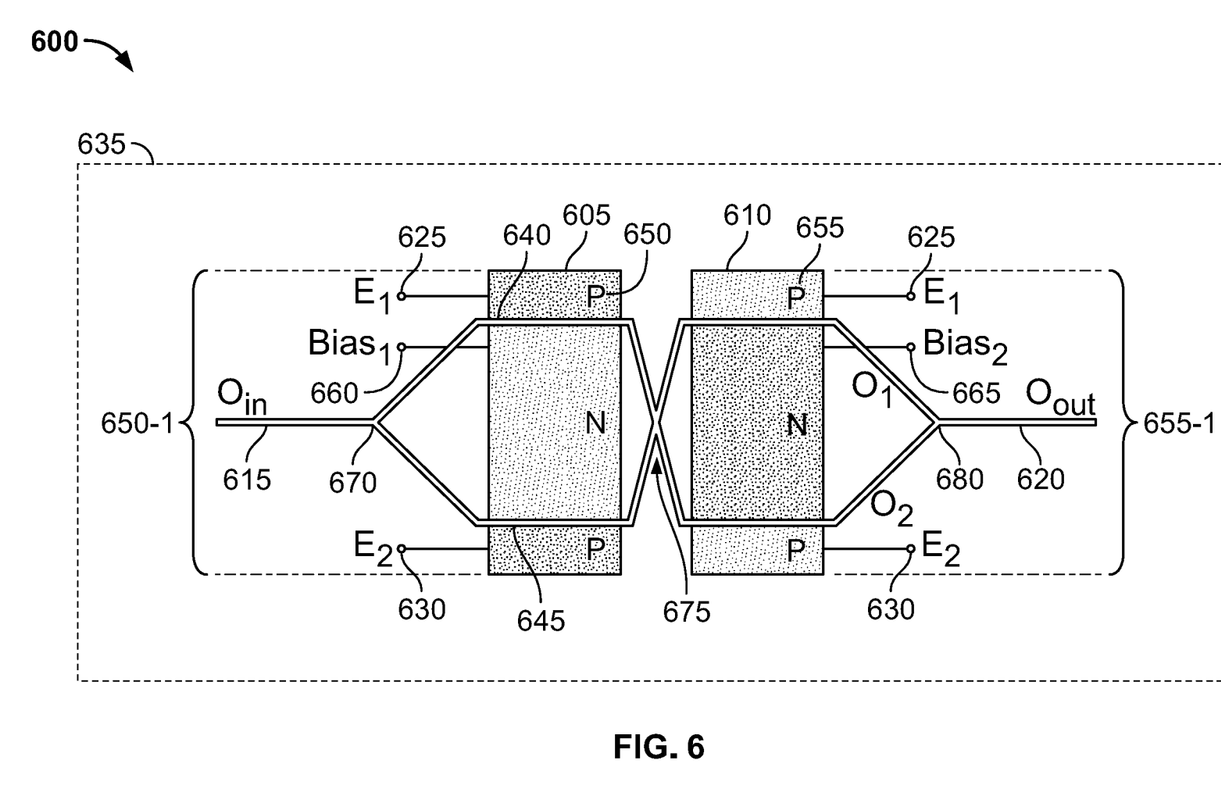
FIG. 6 shows an illustrative schematic of a dual-drive push-pull MZM in accordance with an embodiment.

More particularly, FIG. 6 shows an illustrative schematic of a dual-drive push-pull MZM 600 in accordance with an embodiment. As shown, MZM 600 is fabricated in substrate 635 (e.g., an electro-optic substrate, such as a III-V semiconductor; e.g., Indium Phosphide (InP)) receives optical input signal 615 (e.g., a continuous wave optical signal from a laser source) and is thereafter split at splitter 670 to propagate along two waveguide arms (i.e., first waveguide arm 640 and second waveguide arm 645). Further, in accordance with the embodiment, the MZM is configured with at least two phase shifting sections, namely, phase shifting section 605 and phase shifting section 610. That is, in accordance with this embodiment, a second phase shifting section (i.e., phase shifting section 610) has been added to each waveguide arm. The second pair of phase shifters, having second bias 665 ($bias_2$), are comprised of diodes (i.e., second set of diodes 655) having bias 660 ($bias_1$) in phase shifting section 605. In particular, as shown diodes 655 are in a P-type layer/N-type layer/P-type layer (PNP) connection configuration 655-1 (i.e., a second configuration) the same as the P-type layer/N-type layer/P-type layer (PNP) connection configuration 650-1 (i.e., a first configuration) of diodes 650. Illustratively, phase shifting section 605 and phase shifting section 610 are inter-connected (e.g., in a serial configuration) to one another for modulating the optical signal) in accordance with the embodiment. As will be appreciated, while the illustrative embodiment shown in FIG. 6 employs two phase shifting sections, the principles described herein apply equally to any combination of multiple phase shifting section configurations (i.e., two or more) that are interconnected for modulating the optical signal as detailed herein.

In this dual-drive configuration, opposite sign signals (i.e., differential signal input) are applied to electrodes $E_1$ and $E_2$ such that $V_2=-V1$. As such, the differential signal input defined by the drive signals (i.e., first drive signal 625 ($E_1$) and second drive signal 630 ($E_2$)) for each phase shifter has been swapped (see, e.g., swap region 675) by swapping the two waveguide arms (i.e., first waveguide arm 640 and second waveguide arm 645 having a particular configuration through the optical modulator), such that second drive signal 630 ($E_2$) is applied to the first or top arm (i.e., first waveguide arm 640) and first drive signal 625 ($E_1$) is applied to the second or bottom arm (i.e., second waveguide arm 645). As shown in FIG. 6, the first connection configuration and the second configuration are substantially the same (i.e., both are configured in a P-type layer/N-type layer/P-type layer (PNP) connection configuration), and the particular configuration of the waveguide arms is such that the first waveguide arm and the second waveguide arm pass through the first phase shifter and the second phase shifter where the first waveguide arm is in a first position above the second waveguide arm in the first phase shifter and the first waveguide arm is in a second position below the second waveguide arm in the second phase shifter In this way, given the swapping of the two waveguides in accordance with their particular configuration through the optical modulator, the electric field applied by each drive signal in the second set is the negative of what such signal was in the first set. As the input optical signal propagate through first waveguide arm 640 and second waveguide arm 645, each arm independently modulates their phase and the split signals are ultimately combined (in combiner 680) and output as optical output signal 620.

In accordance with the embodiment, the corresponding phase shifts applied are given by Equations 5 and 6:

$$\phi_1 = \gamma V_1 - \gamma V_2 = \gamma(V_{DM} + V_{CM})\left(\frac{1}{2}V_{DM} + V_{CM}\right) -$$
$$\gamma(-V_{DM} + V_{CM})\left(-\frac{1}{2}V_{DM} + V_{CM}\right) = \gamma V_{DM}$$

$$\phi_2 = \gamma V_2 - \gamma V_1 = \gamma(-V_{DM} + V_{CM})\left(-\frac{1}{2}V_{DM} + V_{CM}\right) -$$
$$\gamma(V_{DM} + V_{CM})\left(\frac{1}{2}V_{DM} + V_{CM}\right) = -\gamma V_{DM}$$

Therefore, the output intensity and phase are given by Equations 7 and 8:

$$I = A_0^2 \cos^2\left(\frac{\phi_1 - \phi_2}{2}\right) = A_0^2 \cos^2\left(\frac{\gamma V_{DM} - (-\gamma V_{DM})}{2}\right) = A_0^2 \cos^2(\gamma V_{DM})$$
$$\Delta\varphi = \frac{\phi_1 + \phi_2}{2} = \frac{\gamma V_{DM} + (-\gamma V_{DM})}{2} = 0$$

Figure 7:
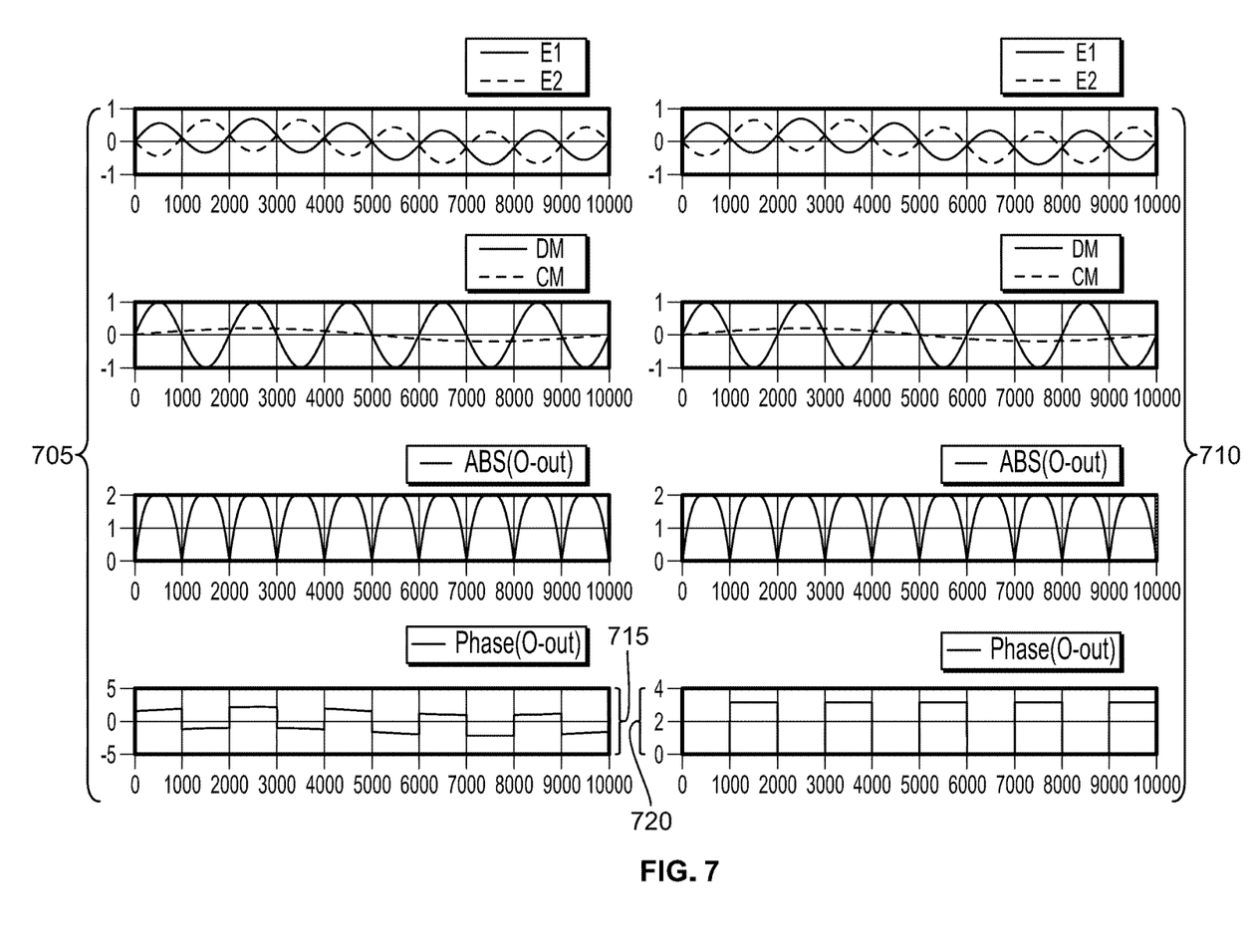
FIG. 7 shows simulation results simulation results from a dual-drive MZM without CM suppression, and simulation results from a dual-drive MZM with CM suppression in accordance with the embodiment shown in FIG. 6.

As demonstrated above, the output intensity has no CM contribution. But unlike prior conventional MZM configurations, the output phase also has no CM contribution and is equal to zero regardless of the DM or CM components. The advantages demonstrated by and the performance of the above-detailed MZM embodiment are illustrated in the simulation results shown in FIG. 7. In particular, simulation results 705 from the dual-drive MZM without CM suppression, and simulation results 710 from the dual-drive MZM with CM suppression (e.g., as shown in FIG. 6). In this case, no parasitic phase shift arises from the structure inherently. However, when a CM signal is added to the input, it will be rejected in the MZM with CM suppression in accordance with the embodiment, and as clearly shown by comparing parasitic phase modulation result 715 to parasitic phase modulation result 720 (as resulting from the dual-drive MZM configured in accordance with the embodiment shown in FIG. 6).

In this way, this embodiment can be used to improve many small-form-factor integrated Mach-Zehnder modulators (e.g., indium phosphide and silicon photonics) used in optical coherent transmission modules (e.g., CFP-DCO, CFP2-ACO, CFP2-DCO) which are currently designed to be driven using differential modulator drivers, in order to minimize the baseline wander effect (as previously detailed above with respect to FIG. 5), and improve performance. However, such differential modulator drivers need to be designed according to stringent requirements so that the CM is suppressed as much as possible.

In contrast, the embodiments herein do not require differential modulator drivers to be designed to suppress CM given the reduced complexity of the design of the optical modulator and electrode design features to suppress such CM. Further, given that CM suppression in dual-drive MZMs, in accordance with the embodiments, will effectively respond primarily (and only) to differential signals, the modulator can be used to subtract two electrical signals. One practical example for this application is if the drivers for the modulator rely on signal subtraction to remove distortion components. In many cases, odd-order distortion components generated in amplifiers because of non-linear transfer curves will be present in the common-mode component only. In accordance with the optical modulator embodiments detailed herein, These distortion components will thus be cancelled if the common-mode component is suppressed. This can greatly relax the distortion specification of the drivers. Since generally, higher linearity in amplifiers can be achieved by increasing the voltage headroom or the DC current, this means that lower power consumption in the driver can be achieved by lowering the linearity specification. This will benefit the design of an optical transmitter module in a number of ways: (1) power savings leading to reductions in electrical power and cooling costs (e.g., in a data center); and (2) low complexity thermal design allowing for tighter integration (i.e., smaller overall footprint), and cost savings in the thermal control of the module (e.g., fans, heat sinks etc.).

Figure 8:
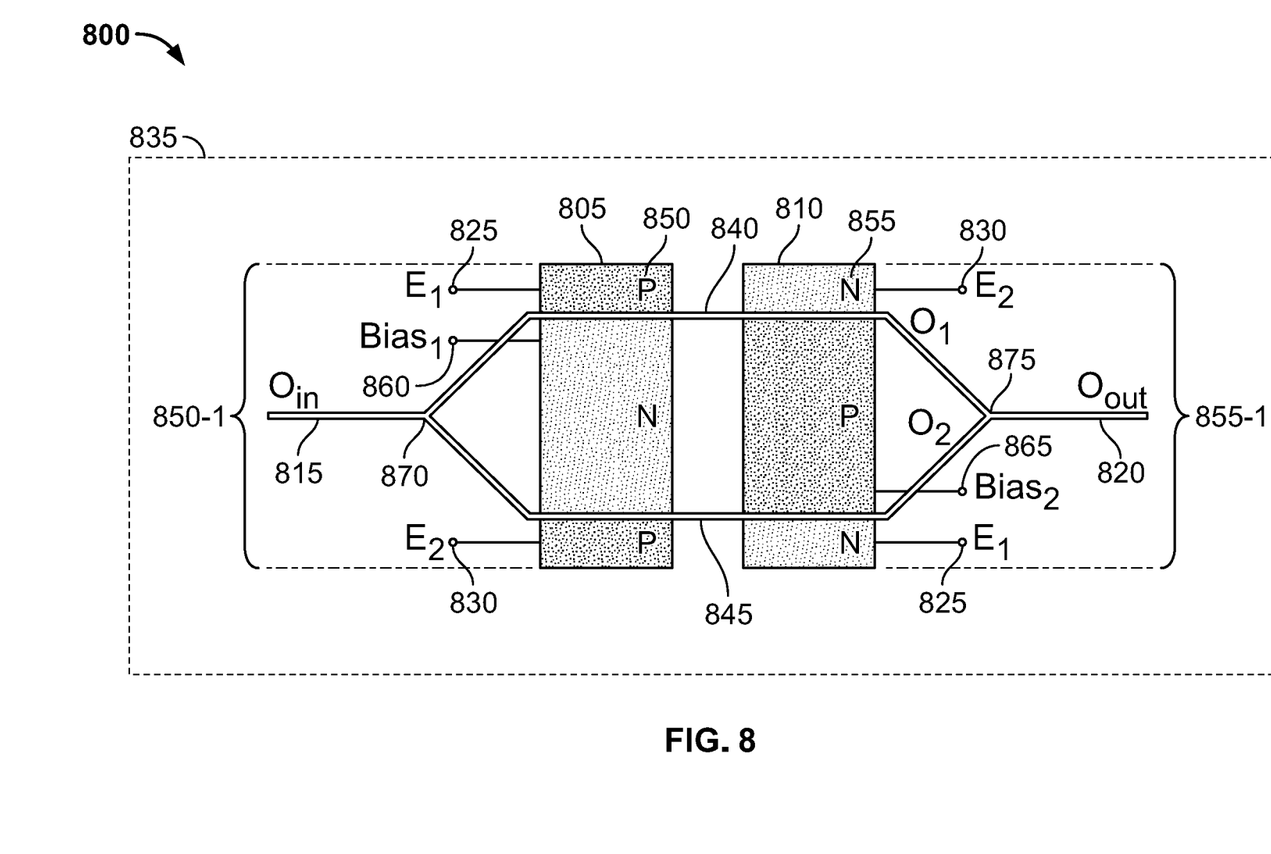
FIG. 8 shows a dual-drive push-pull Mach-Zehnder modulator in accordance with a further embodiment.

FIG. 8 shows a dual-drive push-pull Mach-Zehnder modulator 800 in accordance with a further embodiment that suppresses the electrical CM signal component using differential input in order to mitigate parasitic phase shift effects. The embodiment shown in FIG. 8 shares certain common features with the embodiment shown in FIG. 6 in that opposite sign signals (i.e., differential signal input) are applied to the electrodes such that $V_2=-V1$. except in this embodiment the drive signals (i.e., first drive signal 825 and second drive signal 830; e.g., two electrode signals) are swapped instead of the optical waveguides. Illustratively, this is facilitated by the particular configuration and construction of the phase shifters. Further, as noted above, while the illustrative embodiment shown in FIG. 8 employs two phase shifting sections, the principles described herein apply equally to any combination of multiple phase shifting section configurations (i.e., two or more) that are interconnected for modulating the optical signal as detailed herein.

As shown, MZM 800 is fabricated in substrate 835 (e.g., an electro-optic substrate, such as III-V semiconductor; e.g., Indium Phosphide (InP)) receives optical input signal 815 (e.g., a continuous wave optical signal from a laser source) and is thereafter split at splitter 870 to propagate along two waveguide arms (i.e., first waveguide arm 840 and second waveguide arm 845). Further, in accordance with the embodiment, the MZM is configured with two phase shifting sections, namely, phase shifting section 805 and phase shifting section 810. That is, in accordance with this embodiment, a second phase shifting section (i.e., phase shifting section 810) has been added to each waveguide arm. The second pair of phase shifters, having bias 865 ($bias_2$), are comprised of diodes (i.e., second set of diodes 855) with an opposite configuration than the first set of diodes 850, having bias 860 ($bias_1$) in phase shifting section 805. In particular, as shown diodes 855 are in a N-type layer/P-type layer/N-type layer (NPN) connection configuration 855-1 (i.e., the second configuration) as opposed to (and opposite from) the P-type layer/N-type layer/P-type layer (PNP) connection configuration 850-1 (i.e., the first configuration)

of diodes 850. As such, the first connection configuration and the second connection configuration are opposite one another. The drive signals (i.e., drive signal 825 ($E_1$) and drive signal 830 ($E_2$)) for each phase shifter have been swapped, instead of swapping by and through the optical waveguides (see, e.g., FIG. 6). As shown in FIG. 8, the first connection configuration and the second connection configuration are opposite of one another (i.e., one having a P-type layer/N-type layer/P-type layer (PNP) connection configuration, and the other a N-type layer/P-type layer/N-type layer (NPN) connection configuration), the particular configuration is such that the first waveguide arm and the second waveguide arm pass through the first phase shifter and the second phase shifter in parallel where the first waveguide arm is in a first position above the second waveguide arm in the first phase shifter and the second phase shifter, and the second waveguide arm is in a second position below the first waveguide arm in the first phase shifter and the second phase shifter. Illustratively, as shown, phase shifting section 805 and phase shifting section 810 are inter-connected (e.g., in a serial configuration) to one another for modulating the optical signal) in accordance with the embodiment.

In this way, given that the second set of phase shifter diodes 855 are constructed in a reverse configuration from the first set of phase shifter diodes 850, in the respective phase shifting sections 810 and 805, the electric field applied by each drive signal in the second set is the negative of what such signal was in the first set. As the input optical signal propagate through first waveguide arm 840 and second waveguide arm 845, each arm independently modulates their phase and the split signals are ultimately combined (in combiner 875) and output as optical output signal 820.

Figure 9:
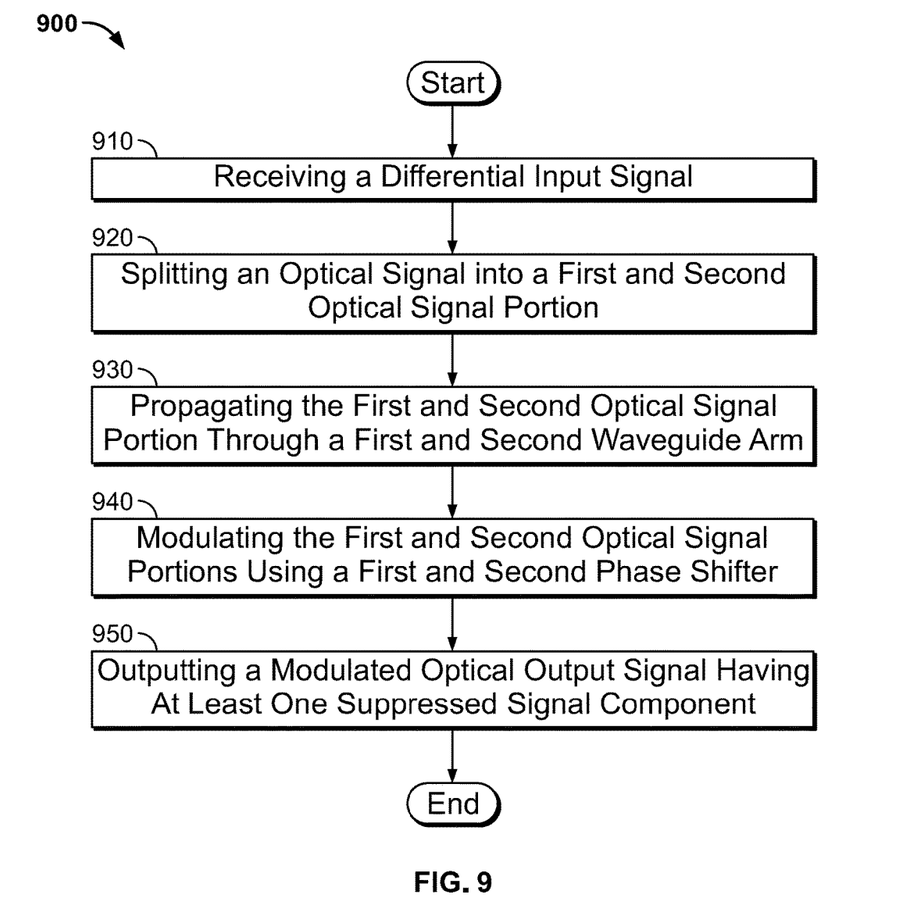
FIG. 9 shows a flowchart of illustrative operations for modulating an optical signal in accordance with an embodiment.

FIG. 9 shows a flowchart of illustrative operations 900 for modulating an optical signal in accordance with an embodiment. For example, by using the dual-drive push-pull Mach-Zehnder modulator as detailed above in FIG. 6 and/or FIG. 8. As shown, the operations for modulating the optical signal using such a dual-drive push-pull Mach-Zehnder optical modulator includes receiving, at step 910, a differential input signal produced from a first electrical drive signal and a second electrical drive signal. At step 920, splitting the optical signal into a first optical signal portion and a second optical signal, and at step 930, propagating the first optical signal portion through a first waveguide arm and propagating the second optical signal portion through a second waveguide arm. At step 940, modulating the first optical signal portion and the second optical signal using a first phase shifter comprising a first set of diodes having a first connection configuration, and a second phase shifter having a second connection configuration, the second connection configuration being in opposite of the first connection configuration, and by applying (i) the first electrical drive signal to the first waveguide arm in the first phase shifter, (ii) the second drive signal to the second waveguide arm in the first phase shifter, (iii) the second electrical drive signal to the first waveguide arm in the second phase shifter and (iv) the first electrical drive signal to the second waveguide arm in the second phase shifter. At step 950, outputting a modulated output optical signal having at least one suppressed signal component from the modulating of the first optical signal portion and the second optical signal.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A dual-drive push-pull Mach-Zehnder optical modulator that accepts a differential input signal resulting from a first electrical drive signal and a second electrical drive signal for modulating an optical signal, the optical modulator comprising:
   a first waveguide arm;
   a second waveguide arm;
   a splitter for splitting the optical signal into a first optical signal portion and a second optical signal portion for propagating the first optical signal portion through the first waveguide arm and propagating the second optical signal portion through the second waveguide arm;
   at least a first phase shifter comprising a first set of diodes having a first connection configuration, and at least a second phase shifter comprising a second set of diodes having a second connection configuration, wherein the first phase shifter and the second phase shifter are inter-connected to one another for the modulating the optical signal; and
   wherein the first waveguide arm and the second waveguide arm have a particular configuration through the optical modulator, and the first electrical drive signal is applied to the first waveguide arm in the first phase shifter, and the second electrical drive signal is applied to the second waveguide arm in the first phase shifter, and the first electrical drive signal is applied to the first waveguide arm in the second phase shifter and the second electrical drive signal is applied to the second waveguide arm in the second phase shifter for modulating the optical signal and producing a modulated optical output signal with at least one suppressed common-mode signal component.

2. The dual-drive push-pull Mach-Zehnder optical modulator of claim 1 wherein (i) the first connection configuration and the second connection configuration are substantially the same; and (ii) the particular configuration is such that the first waveguide arm and the second waveguide arm pass through the first phase shifter and the second phase shifter where the first waveguide arm is in a first position above the second waveguide arm in the first phase shifter and the first waveguide arm is in a second position below the second waveguide arm in the second phase shifter.

3. The dual-drive push-pull Mach-Zehnder optical modulator of claim 1 wherein
   (i) the first connection configuration and the second connection configuration are opposite of one another; and (ii) the particular configuration is such that the first waveguide arm and the second waveguide arm pass through the first phase shifter and the second phase shifter in parallel where the first waveguide arm is in a first position above the second waveguide arm in the first phase shifter and the second phase shifter, and the second waveguide arm is in a second position below the first waveguide arm in the first phase shifter and the second phase shifter.

4. The dual-drive push-pull Mach-Zehnder optical modulator of claim 2 wherein the first connection configuration and the second connection configuration are each a three layer configuration of a P-type layer/N-type layer/P-type layer.

5. The dual-drive push-pull Mach-Zehnder optical modulator of claim 4 wherein the three layer configuration of the P-type layer/N-type layer/P-type layers includes a semiconductor material selected from the group consisting of Indium Phosphide (InP), Gallium Arsenide (GaAs), and Silicon (Si) and
the dual-drive push-pull Mach-Zehnder optical modulator is configured to subtract the first electrical drive signal from the second electrical drive signal.

6. The dual-drive push-pull Mach-Zehnder optical modulator of claim 3 wherein the dual-drive push-pull Mach-Zehnder optical modulator is configured to apply an electrical field having a first value in the first set of diodes and a second value in the second set of diodes, the first value being in opposite to the second value.

7. The dual-drive push-pull Mach-Zehnder optical modulator of claim 3 wherein the first connection configuration of the first set of diodes is a three layer configuration of a P-type layer/N-type layer/P-type layer, and the second connection configuration of the second set of diodes is a three layer configuration of a N-type layer/P-type layer/N-type layer.

8. The dual-drive push-pull Mach-Zehnder optical modulator of claim 7 wherein the three layer configuration of the P-type layer/N-type layer/P-type layers includes a semiconductor material selected from the group consisting of Indium Phosphide (InP), Gallium Arsenide (GaAs), and Silicon (Si).

9. The dual-drive push-pull Mach-Zehnder optical modulator of claim 1 wherein the first phase shifter and the second phase shifter are part of a plurality of phase shifters that are inter-connected for the modulating the optical signal, and each phase shifter of the plurality of phase shifters having a respective connection configuration.

10. A method for modulating an optical signal using a dual-drive push-pull Mach-Zehnder optical modulator comprising:
receiving a differential input signal produced from a first electrical drive signal and a second electrical drive signal;
splitting the optical signal into a first optical signal portion and a second optical signal portion;
propagating the first optical signal portion through a first waveguide arm and propagating the second optical signal portion through a second waveguide arm, the first waveguide arm and the second waveguide arm having a particular configuration through the optical modulator;
modulating the first optical signal portion and the second optical signal portion using at least a first phase shifter comprising a first set of diodes having a first connection configuration, and at least a second phase shifter having a second set of diodes having a second connection configuration, the first phase shifter and the second phase shifter being inter-connected, by applying (i) the first electrical drive signal to the first waveguide arm in the first phase shifter, (ii) the second electrical drive signal to the second waveguide arm in the first phase shifter, (iii) the first electrical drive signal to the first waveguide arm in the second phase shifter and (iv) the second electrical drive signal to the second waveguide arm in the second phase shifter; and
outputting a modulated output optical signal having at least one suppressed common-mode signal component resulting from the modulating of the first optical signal portion and the second optical signal portion.

11. The method of claim 10 wherein (i) the first connection configuration and the second connection configuration are substantially the same; and (ii) the particular configuration is such that the first waveguide arm and the second waveguide arm pass through the first phase shifter and the second phase shifter where the first waveguide arm is in a first position above the second waveguide arm in the first phase shifter and the first waveguide arm is in a second position below the second waveguide arm in the second phase shifter.

12. The method of claim 10 wherein (i) the first connection configuration and the second connection configuration are opposite of one another; and (ii) the particular configuration is such that the first waveguide arm and the second waveguide arm pass through the first phase shifter and the second phase shifter in parallel where the first waveguide arm is in a first position above the second waveguide arm in the first phase shifter and the second phase shifter, and the second waveguide arm is in a second position below the first waveguide arm in the first phase shifter and the second phase shifter.

13. The method of claim 11 wherein the first connection configuration and the second connection configuration are each a three layer configuration of a P-type layer/N-type layer/P-type layer.

14. The method of claim 13 wherein the three layer configuration of the P-type layer/N-type layer/P-type layers includes a semiconductor material selected from the group consisting of Indium Phosphide (InP), Gallium Arsenide (GaAs), and Silicon (Si), and the first electrical drive signal is subtracted from the second electrical drive signal.

15. The method of claim 12 wherein an electrical field has a first value in the first set of diodes and a second value in the second set of diodes, the first value being in opposite to the second value.

16. The method of claim 10 further comprising:
re-combining the first optical signal portion with the second optical signal portion after the propagating thereof through the first waveguide arm and the second waveguide arm.

17. The method of claim 12 wherein the first connection configuration of the first set of diodes is a three layer configuration of a P-type layer/N-type layer/P-type layer, and the second connection configuration of the second set of diodes is a three layer configuration of a N-type layer/P-type layer/N-type layer.

18. The method of claim 11 wherein the first phase shifter and the second phase shifter are part of a plurality of phase shifters that are inter-connected for the modulating the optical signal, and each phase shifter of the plurality of phase shifters having a respective connection configuration.

* * * * *